(No Model.) 2 Sheets—Sheet 1.

G. WESTINGHOUSE, Jr.
NUT LOCK.

No. 382,920. Patented May 15, 1888.

WITNESSES:

INVENTOR, (No Model.) 2 Sheets—Sheet 2.

G. WESTINGHOUSE, Jr.
NUT LOCK.

No. 382,920. Patented May 15, 1888.

WITNESSES:
O. M. Clarke
R. H. Whittlesey.

INVENTOR,
Geo. Westinghouse Jr.
by J. Snowden Bell, Att'y.

UNITED STATES PATENT OFFICE.

GEORGE WESTINGHOUSE, JR., OF PITTSBURG, PENNSYLVANIA.

NUT-LOCK.

SPECIFICATION forming part of Letters Patent No. 382,920, dated May 15, 1888.

Application filed July 11, 1887. Serial No. 243,913. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Nut-Locks, of which improvement the following is a specification.

The object of my invention is to provide simple, effective, and inexpensive means for compensating for such wear of rails, splicebars, or other members united by bolt-and-nut connections as under ordinary conditions induces the slackening thereof, and to prevent the loosening of the same by the unscrewing of the nut from its normal bearing under the influence of jars and shocks sustained by the structure in which the bolt and nut are employed.

To this end my invention, generally stated, consists in a nut having its bearing-face located upon an unthreaded extension of its body, reduced in transverse section relatively thereto, so as to possess substantial elasticity, and in the combination of a nut, as specified, with a bolt which is reduced in transverse section between its head and the adjacent end of its thread.

The improvement claimed is hereinafter fully set forth.

Figure 1:
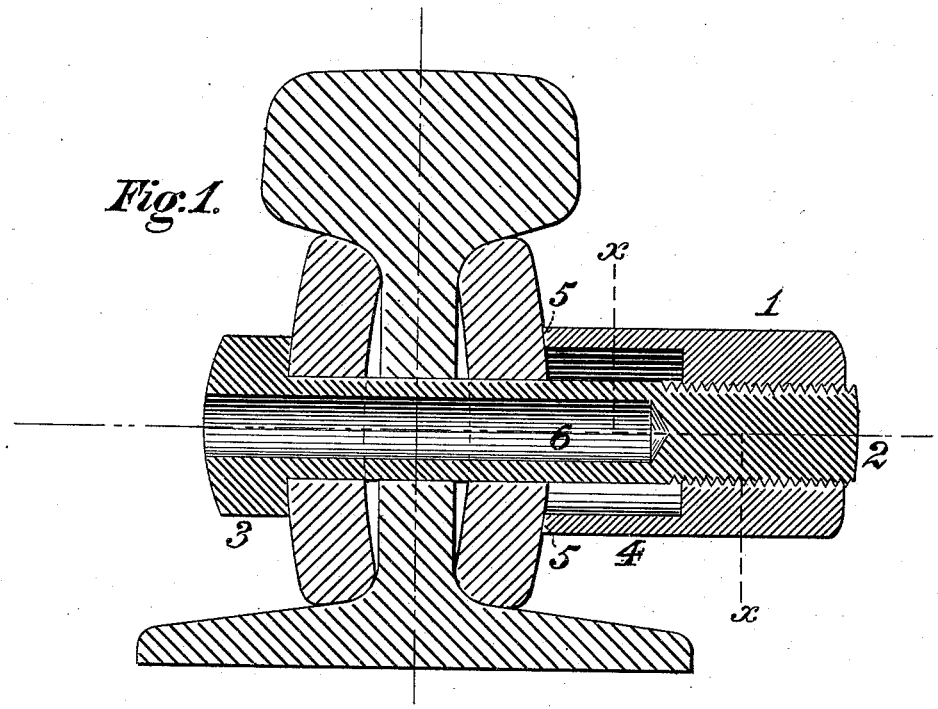
Figure 2:
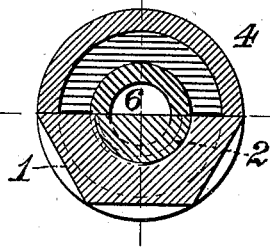

In the accompanying drawings, Figure 1 is a longitudinal central section through a bolt and nut embodying my invention as applied to the connection of a railroad-rail and a pair of splice-bars; Fig. 2, a transverse section at the line *x x* of Fig. 1, and Figs. 3, 4, and 5 longitudinal central sections illustrating modifications of my invention.

In the practice of my invention I provide a nut having a body, 1, which is of the ordinary form and dimensions, as usual, provided with an internal screw-thread which engages the external thread of the bolt 2, and is of a length and diameter proper to enable the clamping strain of the nut to be exerted in full correspondence with the capacity of safe resistance of the bolt.

In lieu of bearing directly upon one of the connected elements or upon an interposed washer, as heretofore, the body 1 of the the nut is prolonged on the face nearest the head 3 of the bolt by a longitudinal extension, 4, which is unprovided with a screw-thread, and is of reduced transverse section relatively to the body, upon the end of which extension the bearing-face 5 of the nut is located. The specific form of the extension 4 is not of substantial importance, and may be varied materially, within the discretion of the constructor, the only requisite being that it shall be reduced in transverse section as far as is compatible with a normal factor of strength, in order that the metal of which it is composed shall be capable of exerting a substantial degree of elasticity under the compression induced when the nut is screwed to a tight bearing upon the bolt and the adjacent connected element. The clamping strain of the nut being thus transmitted through an elastic member, the extension 4, the loosening of the nut from the bolt is opposed by a constant pressure, by which, when the nut is tight, the tendency of wear of the parts to loosen it is counteracted, and by which, further, the nut is prevented from unscrewing or backing off under the influence of jar or vibration to which the structure in which it is applied may from time to time be subjected.

For the purpose of supplementing as far as may be the locking pressure exerted by the provision of the extension above described, the bolt 2 is also rendered elastic under compression by similarly reducing its transverse section between its head 3 and the adjacent end of its thread, such reduction being most desirably effected by forming a central cavity or bore, 6, in the unthreaded portion of the bolt or by externally reducing the bolt in diameter between its head and thread.

It will be seen that the elasticity of the reduced portion of the bolt acts between the bearing-surface of its head on the adjacent connected element and the body of the nut in corresponding direction, and with similar effect to the elasticity of the unthreaded portion or extension of the nut.

Figure 3:
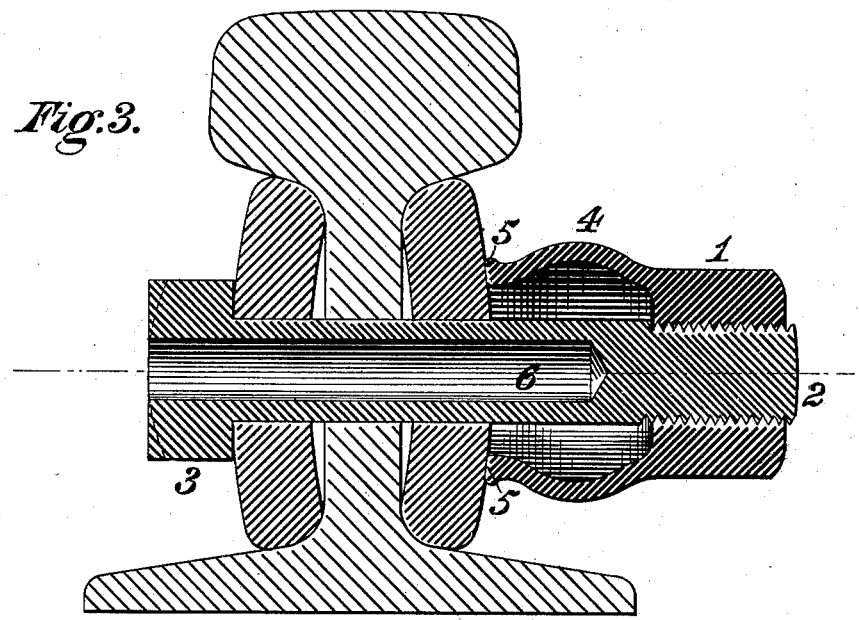
Figure 4:
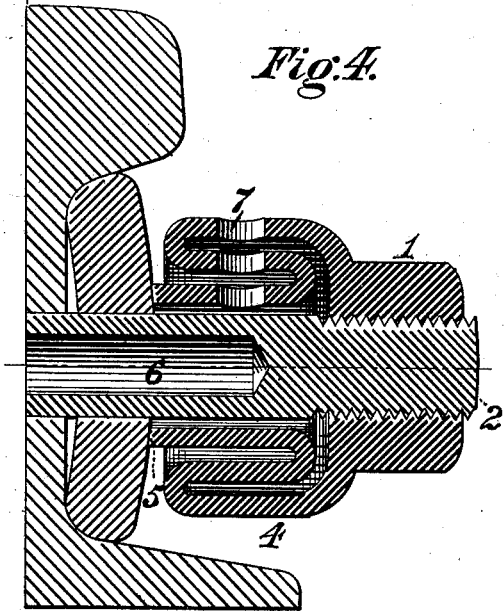
Figure 5:
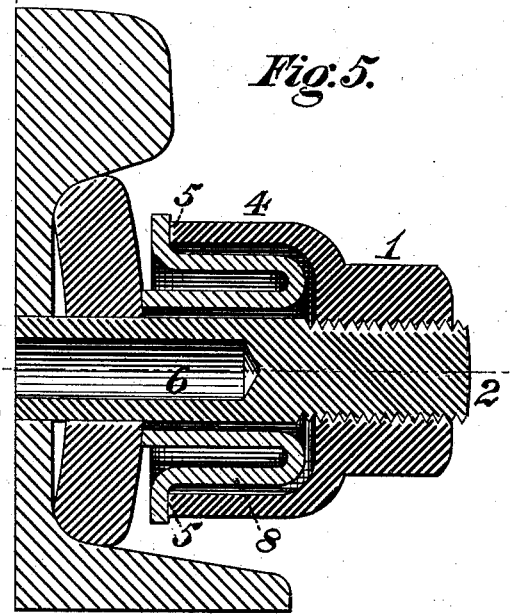

As shown in Figs. 1 and 2, the elastic extension of the body of the nut is of continuous cylindrical section; but it might, if preferred, be composed of a series of bars separated by slots or open spaces. The modifications shown in Figs. 3, 4, and 5 illustrate instances in which an increased degree of elasticity is attained by increase of length of the extension of the nut without substantial increase in the length of the bolt. Thus the extension 4 of Fig. 3 is in the form of a zone or portion of a sphere, and that of Fig. 4 is made up of three concentric bands of cylindrical form connected at alternate ends, thereby providing nearly three times the length of metal available for elasticity relatively to the nut first described. A nut of this character may have more than three bands in its extension and may be made of good malleable iron, the core being removed through the lateral passage 7. Fig. 5 shows a construction similar in principle to that of Fig. 4, but differing structurally therefrom in the particular that the extension proper is of cylindrical form and of a single thickness only, a separate or supplemental extension, 8, in the form of two concentric cylinders connected at one end, being interposed between its bearing-face 5 and the adjacent splice-bar.

It will be obvious that the extension proper might consist of two cylinders and the supplemental extension of a single cylinder, if preferred.

I am aware that elastic washers of various descriptions have long been known and used, and do not therefore desire to be understood as claiming broadly the interposition of an elastic member between a nut and the element to which its pressure is to be transmitted, and I further disclaim a lock-nut which is recessed or bent over to inclose or to bear against a contrarily-threaded main nut.

I claim herein as my invention—

1. A nut having a body provided with an internal thread which is adapted to engage an ordinary single-threaded bolt to which the nut is to be applied, and is of proper length to exert the maximum clamping force which the bolt is designed to sustain, and having its bearing-face located upon a blank or unthreaded extension which is reduced in thickness relatively to the body sufficiently to present a substantial degree of elasticity, substantially as set forth.

2. A nut having its bearing-face located upon a blank or unthreaded elastic extension of its body in the form of two or more concentric bands, substantially as set forth.

3. The combination of a nut having an ordinary internally-threaded body and having its bearing-face located upon an elastic unthreaded extension reduced in thickness relatively to the body, as described, and a bolt the thickness of metal of which is reduced between its head and the adjacent end of its thread, substantially as set forth.

In testimony whereof I have hereunto set my hand.

GEO. WESTINGHOUSE, JR.

Witnesses:
W. D. UPTEGRAFF,
J. SNOWDEN BELL.